US008867895B2

(12) United States Patent
Hosokawa

(10) Patent No.: US 8,867,895 B2
(45) Date of Patent: Oct. 21, 2014

(54) DATA PROCESSING APPARATUS, METHOD, AND CONTROL PROGRAM

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 13/568,610

(22) Filed: Aug. 7, 2012

(65) Prior Publication Data

US 2013/0051774 A1 Feb. 28, 2013

(30) Foreign Application Priority Data

Aug. 31, 2011 (JP) ................................. 2011-189397

(51) Int. Cl.
*H04N 5/92* (2006.01)
*H04N 9/804* (2006.01)
*H04N 5/765* (2006.01)
*H04N 9/82* (2006.01)

(52) U.S. Cl.
CPC ............ *H04N 5/765* (2013.01); *H04N 9/8042* (2013.01); *H04N 9/8205* (2013.01); *H04N 9/8211* (2013.01)
USPC .......................................... 386/248; 386/200

(58) Field of Classification Search
None
See application file for complete search history.

(56) References Cited

U.S. PATENT DOCUMENTS

| | | | |
|---|---|---|---|
| 2003/0103073 A1 | 6/2003 | Yoyama | |
| 2006/0288027 A1 | 12/2006 | Murakami et al. | |
| 2007/0143807 A1* | 6/2007 | Suneya | 725/115 |
| 2008/0298768 A1* | 12/2008 | Isobe et al. | 386/52 |
| 2008/0310411 A1* | 12/2008 | Yamauchi et al. | 370/389 |
| 2009/0201949 A1* | 8/2009 | Sunahara | 370/474 |
| 2009/0263103 A1* | 10/2009 | Mae et al. | 386/95 |

FOREIGN PATENT DOCUMENTS

| | | |
|---|---|---|
| JP | 2005-033630 A | 2/2005 |
| JP | 2005348078 A | 12/2005 |
| JP | 2006-074531 | 3/2006 |
| JP | 2007-006140 A | 1/2007 |
| JP | 2007006140 A | 1/2007 |

OTHER PUBLICATIONS

Feb. 8, 2013 Great Britain Combined Search Report and Examination Report of the counterpart Great Britain Patent Application No. 1215427.4.
Feb. 6, 2014 Japanese Office Action, that issued in Japanese Patent Application No. 2011-189397.
Jan. 6, 2014 Japanese Office Action, that issued in Japanese Patent Application No. 2011-189397.
Mar. 20, 2014 Russian Office Action, that issued in Russian Patent Application No. 2012137090.
May 29, 2014 Japanese Office Action, that issued in Japanese Application No. 10100827JP2.
May 29, 2014 Japanese Office Action, that issued in Japanese Application No. 2013-172145.

* cited by examiner

*Primary Examiner* — William C Vaughn, Jr.
*Assistant Examiner* — Eileen Adams
(74) *Attorney, Agent, or Firm* — Cowan, Liebowitz & Latman, P.C.

(57) ABSTRACT

A data processing apparatus generates an information file which has a plurality of storage unit elements each of which includes size information and which information file include one or more first storage unit elements each for storing encoded information data and one or more second storage unit elements each for storing management information regarding the information data stored in the first storage unit element, such that a new first storage unit element is formed for every predetermined amount of the encoded information data, and the second storage unit element corresponding to the formed first storage unit element is formed, thereby generating information file.

15 Claims, 10 Drawing Sheets

| box size | box type | box data |
|---|---|---|

202
+ ftyp
+ moov
+ mdat

203
+ ftyp
+ moov
+ mdat
+ moof 1
+ mdat
+ moof 2
+ mdat

⋮

+ moof n
+ mdat

204
+ moov
   + mvhd
   + trak
      + tkhd
      + mdia
         + mdhd
         + stbl
   + trak
      + tkhd
      + mdia
         + mdhd
         + stbl

205
+ moof
   + mfhd
   + traf
      + tfhd
      + trun
   + traf
      + tfhd
      + trun

DATA PROCESSING APPARATUS, METHOD, AND CONTROL PROGRAM

BACKGROUND OF THE INVENTION

1. Field of the Invention

The present invention relates to a data processing apparatus and, more particularly, to a data processing apparatus, method, and control program for encoding information data and outputting externally, over a network for example.

2. Description of the Related Art

In the related art, an MP4 file format has been known as a file format for recording a moving image signal and an audio signal into a recording medium (refer to the Official Gazette of Japanese Patent Application Laid-Open No. 2006-074531). According to the MP4 format, besides an area for storing the encoded moving image signal and audio signal, an area for storing management information necessary to reproduce and decode a moving image and an audio is provided.

The management information includes information of a size of data. The data size is not decided until the recording of the moving image and audio is actually stopped. Therefore, for example, a method whereby the management information is formed during the recording of the moving image and stored into a buffer memory or the like in the apparatus, and after the recording of the moving image is stopped, the management information is recorded into the recording medium is considered.

It is also possible to arrange in such a manner that while encoding the moving image and audio, they are converted into the format of the MP4 file and transmitted externally through a network or the like, for example to a separate receiver. An arrangement in which an apparatus which received the MP4 file transmitted as mentioned above sequentially decodes the data of the MP4 file is considered.

However, according to the arrangement in which after recording (encoding) of the moving image is stopped, the management information is formed and transmitted as mentioned above, there is a problem that until the management information is received, an apparatus on the reception side cannot decode the moving image and audio which have already been received.

SUMMARY OF THE INVENTION

The present invention has been made in consideration of the above situation, and it is an aim of certain aspects of the invention to transmit an information data file including management information externally so that a reception side can promptly reproduce the received information data.

According to a first aspect of the invention, a data processing apparatus generates an information file which has a plurality of storage unit elements each of which includes size information and which information file includes one or more first storage unit elements each for storing encoded information data and one or more second storage unit elements each for storing management information of the information data stored in the first storage unit element, so as to generate a new first storage unit element for every predetermined amount of the encoded information data and form the second storage unit element corresponding to the formed first storage unit element, thereby generating the information file.

Further features of the present invention will become apparent from the following description of exemplary embodiments with reference to the attached drawings.

BRIEF DESCRIPTION OF THE DRAWINGS

FIG. 2 is a diagram illustrating a construction of an MP4 file.

DESCRIPTION OF THE EMBODIMENTS

Exemplary embodiments of the present invention will be described in detail hereinbelow with reference to the drawings.

First Embodiment

Figure 1:
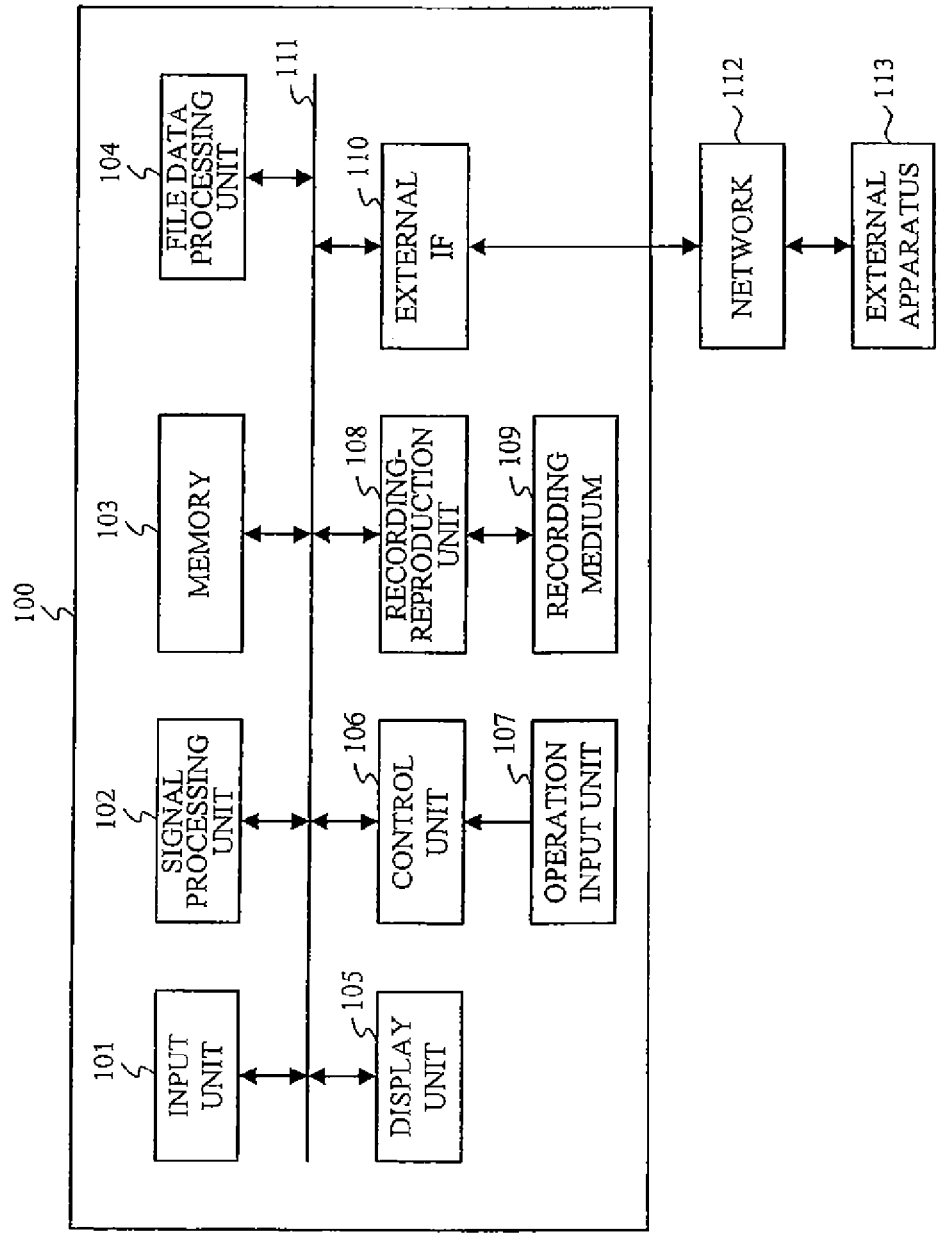
FIG. 1 is a block diagram illustrating one constructional example of a data processing apparatus according to an embodiment of the invention.

FIG. 1 is a block diagram illustrating a constructional example of a data processing apparatus 100 according to the present embodiment of the invention.

In FIG. 1, an input unit 101 obtains moving image data and audio data to output them. In the embodiment, the input unit 101 inputs the moving image data and audio data supplied from an outside of the data processing apparatus 100. However, the input unit 101 may be constructed such manner that it includes an image pickup unit and a microphone so that a moving image which is photographed by the image pickup unit and an audio which is picked up by the microphone are respectively obtained as data.

Upon recording, a signal processing unit 102 encodes the moving image data and audio data which are input by the input unit 101, in accordance with a well-known encoding format such as H.264 (MPEG4 AVC) or the like and compresses an information amount of them. The signal processing unit 102 also executes processings necessary for recording the moving image data and audio data. Upon reproduction, the signal processing unit 102 decodes reproduced moving image data and audio data and expands an information amount of them. Upon recording, the signal processing unit 102 outputs information of a code amount (data amount) of the encoded moving image data and audio data to a control unit 106.

A memory 103 stores the moving image data and audio data. By accessing the memory 103, each block of the data processing apparatus 100 processes the necessary moving image data and audio data. The memory 103 stores various kinds of information such as information of a file system, management information of a moving image file, and the like besides the moving image data and audio data. Further, the memory 103 plays a role of a work memory or the like for control by the control unit 106.

Upon recording, a file data processing unit 104 forms various kinds of management information specified by the MP4 file as will be described hereinafter. Upon reproduction, the file data processing unit 104 processes the reproduced management information and notifies the control unit 106 of contents of the management information. A display unit 105 displays the moving image which is input or reproduced or various kinds of information such as menu information and the like.

The control unit 106 controls the whole operation of the data processing apparatus 100 in accordance with an input from an operation input unit 107. The control unit 106 includes a microcomputer, a memory, and the like and controls the data processing apparatus 100 in accordance with a program stored in a memory (not shown). The operation input unit 107 includes various kinds of switches which can be operated by the user, receives various kinds of instructions by the user, and notifies the control unit 106 of them. The operation input unit 107 also includes a power switch, a switch to instruct the star/stop of the recording, a switch to change over modes of the data processing apparatus 100, and the like.

A recording-reproduction unit 108 records the moving image data and audio data or various kinds of information in a recording medium 109 and reproduces those data from the recording medium 109. Upon recording, the recording-reproduction unit 108 records the management information, moving image data, or audio data stored in the memory 103 in the recording medium 109 by a file format as will be described hereinafter. Upon reproduction, the recording-reproduction unit 108 reproduces the management information, moving image data, and audio data of the moving image file from the recording medium 109 and stores into the memory 103. In the embodiment, the recording medium 109 is a random-accessible recording medium such as hard disk (HDD), flash memory card, or the like.

The recording-reproduction unit 108 manages the moving image file or various kinds of information which is recorded in the recording medium 109, as a file in accordance with a file system such as FAT (File Allocation Table) or the like. Although the apparatus is constructed such that the recording medium 109 can be easily loaded and ejected into/from the data processing apparatus 100 by a loading and ejecting mechanism (not shown), the data processing apparatus 100 may be arranged to have the built-in recording medium 109.

In the case of writing and reading the moving image file into/from the recording medium 109, the control unit 106 controls the recording-reproduction unit 108 so as to reproduce file system data (management data) from the recording medium 109 and store into the memory 103. The file system data is data showing a file name of the data recorded in the recording medium 109, a file size, a recording address of the data, and the like and is management information for managing the file. The control unit 106 controls the writing and reading-out of the file in accordance with the read-out file system data. The control unit 106 updates the file system data stored in the memory 103 in accordance with the file being written into the recording medium 109. The updated file system data is recorded into the recording medium 109 by the recording-reproduction unit 108.

In a case where the data processing apparatus 100 is set into an external transmission mode, an external interface (IF) 110 receives the moving image file formed by the recording instruction of the user and transmits the moving image file to an external apparatus 113 through a network 112.

Subsequently, an information file which is handled in the present embodiment will be described. In the present embodiment, the moving image data and audio data are recorded or transmitted in accordance with the MP4 file format. The MP4 file is constructed by a unit called a box. A construction of one box 201 is illustrated in FIG. 2. One box 201 includes areas of box-size, box-type, and box-data. Information (size information) of a data length (bytes) of this box is stored into box-size. Information showing a data type which is stored in box-data is stored into box-type. The box-type is a data area of a fixed length of 32 bits. The box-data is a variable-length area. Since the box-size is equal to 32 bits, a size of one box is ordinarily equal to or less than 0xFFFFFFFF bytes.

Reference numerals 202 and 203 in FIG. 2 denote diagrams showing constructional examples of the MP4 file (information file) which is handled in the present embodiment. Each of the files 202 and 203 is constructed by a plurality of boxes 201. The file 202 is constructed by three storage unit elements of FileTypeBox(ftyp-box), MovieBox(moov-box), and MediaDataBox(mdat-box).

ftyp is a box of box-type ftyp, and which stores therein information on file interchangeability. An encoding method or the like of the moving image data and audio data stored in the MP4 file can be discriminated on the basis of box-data described in ftyp.

A moov is a box box-type of box-type moov and which stores therein management information regarding the moving image data and audio data. Information such as chunk offset showing an offset from a file head of a chunk of each of the moving image data and the audio data, and the number of samples of each chunk, sample size, and the like is stored in the box-data of the moov. A state of the moov box is shown at 204 in FIG. 2. The moov includes mvhd and one or more trak. A trak box is information which defines one or more video tracks or video and audio tracks. The trak includes tkhd and mdia. The mdia is information describing a media type and the like of each track. The mdia includes mdhd and stbl. Information such as chunk offset showing the offset from the file head of the chunk of each of the moving image data and the audio data, the number of samples of each chunk, display time of the sample, sample size, and the like is stored in stbl. One sample of the moving image data corresponds to a frame. One sample of the audio image data corresponds to an audio frame.

A mdat is a box of box-type mdat and which stores therein each sample of the moving image data and the audio data. The encoded moving image data and audio data are divided into units called chunks to be stored, respectively. In the present embodiment, it is assumed that one chunk of the moving image data is moving image data of 1 GOP (group of picture) specified by the H.264 system and one chunk of the audio data is audio data of the number of frames corresponding to 1 GOP.

As shown in the file 203, MovieFragmentBox(moof-box) to divide the mdat box into a plurality of areas and arrange them can be also used. A moof is a box of box-type moof and in which management information of the mdat box subsequent thereto is stored in box-data. One moov box and n moof boxes are included in the file 203. A construction of the moof box is shown at 205 in FIG. 2. The mfhd and one or more traf are included in the box-data of the moof. A fragment sequence number is stored in the mfhd. A traf box is information which defines one or more video tracks or video and audio tracks. Each traf includes the tfhd and trun. Default values of a length (duration) and a size of each chunk stored in subsequent mdat are stored in the tfhd. In the case where a display time and a size of the sample which is stored in each chunk stored in the subsequent mdat change on a sample unit basis, their values are stored in the trun. When the sizes of the chunks stored in the mdat differ, information of an offset value from the head of the mdat to the head of each chunk is also stored in the trun.

In the mdia and stbl of the moov, information such as size, offset, and the like regarding a plurality of chunks constructing each track is stored in one box-data. Information such as size, offset, and the like regarding one chunk is stored in the trun of the moof. Therefore, trun boxes of the same number as the number of chunks which are stored in the mdat later are stored in the moof.

In this manner, one file 203 of the MP4 format can be constructed by one moov box, one or more mdat boxes (a plurality of first storage unit elements), and one or more moof boxes (a plurality of second storage unit elements). Each size of the moov, mdat, and moof changes in dependence on the number of sample data of the moving image or audio, that is, a recording time and a data amount of the moving image and audio data subjected to the compression.

Subsequently, a recording processing of a moving image and a transmission processing to an outside will now be described. In the present embodiment, processings which will be described by using flowcharts are realized by a method whereby the control unit 106 loads a program stored in a memory (not shown) and executes, thereby controlling each unit.

Figure 3:
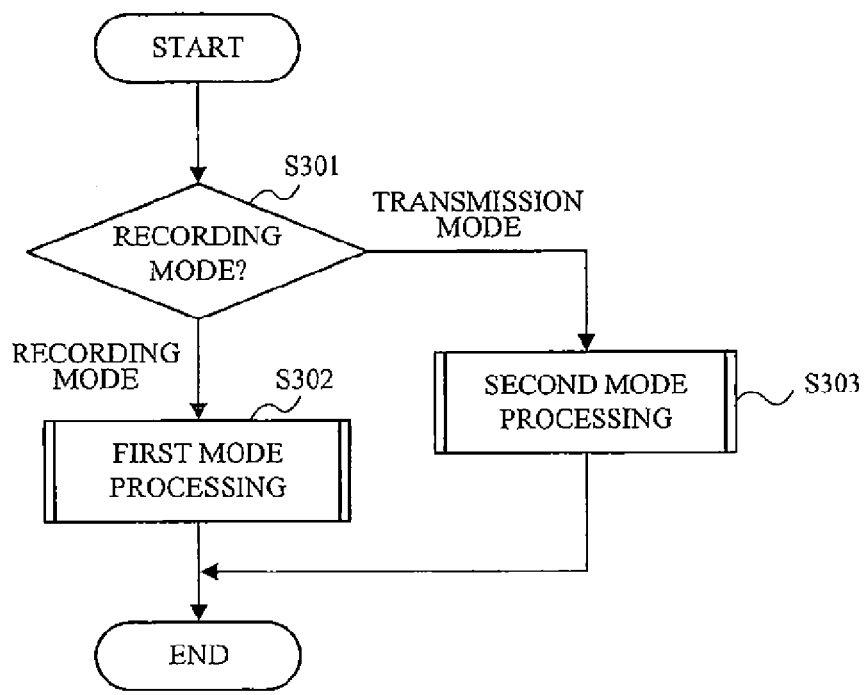
FIG. 3 is a flowchart for an example of the operation in one constructional example of the data processing apparatus according to the embodiment of the invention.

FIG. 3 is a flowchart illustrating the processings upon recording. By operating the operation input unit 107, the user can select one of a recording mode for recording the moving image and audio which are input in the recording medium 109 and a transmission mode for transmitting the moving image and audio which are input to the outside instead of recording them. When a recording start instruction is received from the operation input unit 107 in a state where one of the recording mode and the transmission mode is selected as mentioned above, the control unit 106 discriminates the set mode (S301).

If the recording mode is set, the control unit 106 executes a first mode processing (S302). If the transmission mode is set, the control unit 106 executes a second mode processing (S303). An information file of a format suitable for an output destination is generated by each mode processing.

Figure 4:
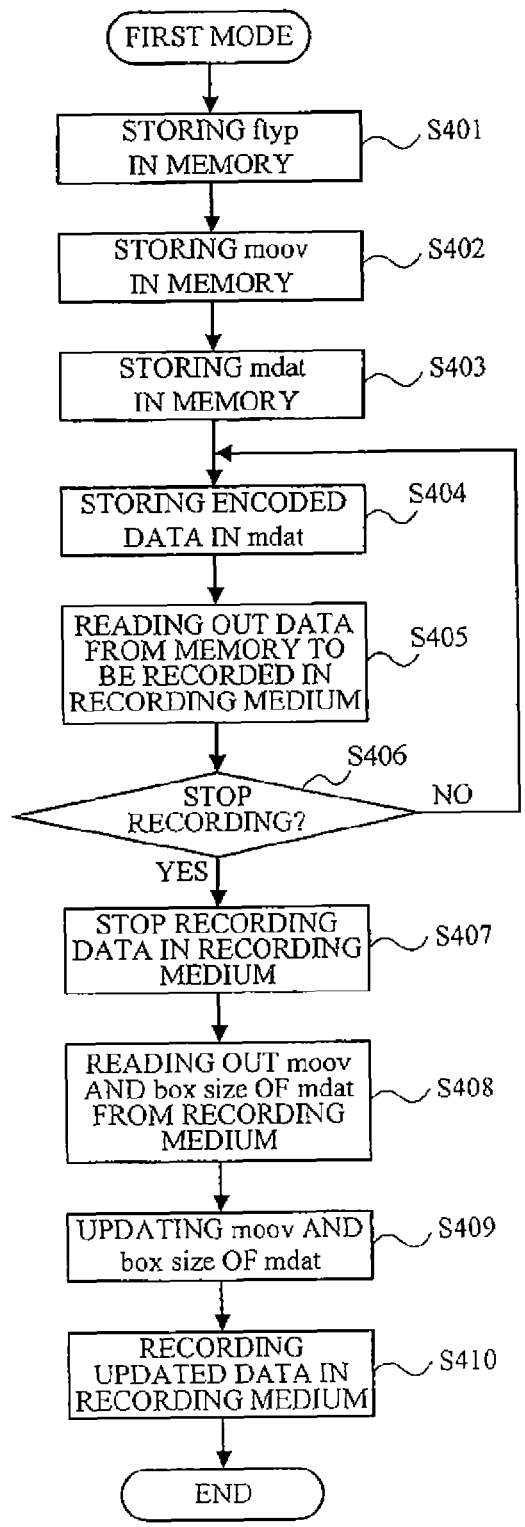
FIG. 4 is a flowchart for a first mode processing according to the embodiment of the invention.
Figure 5:
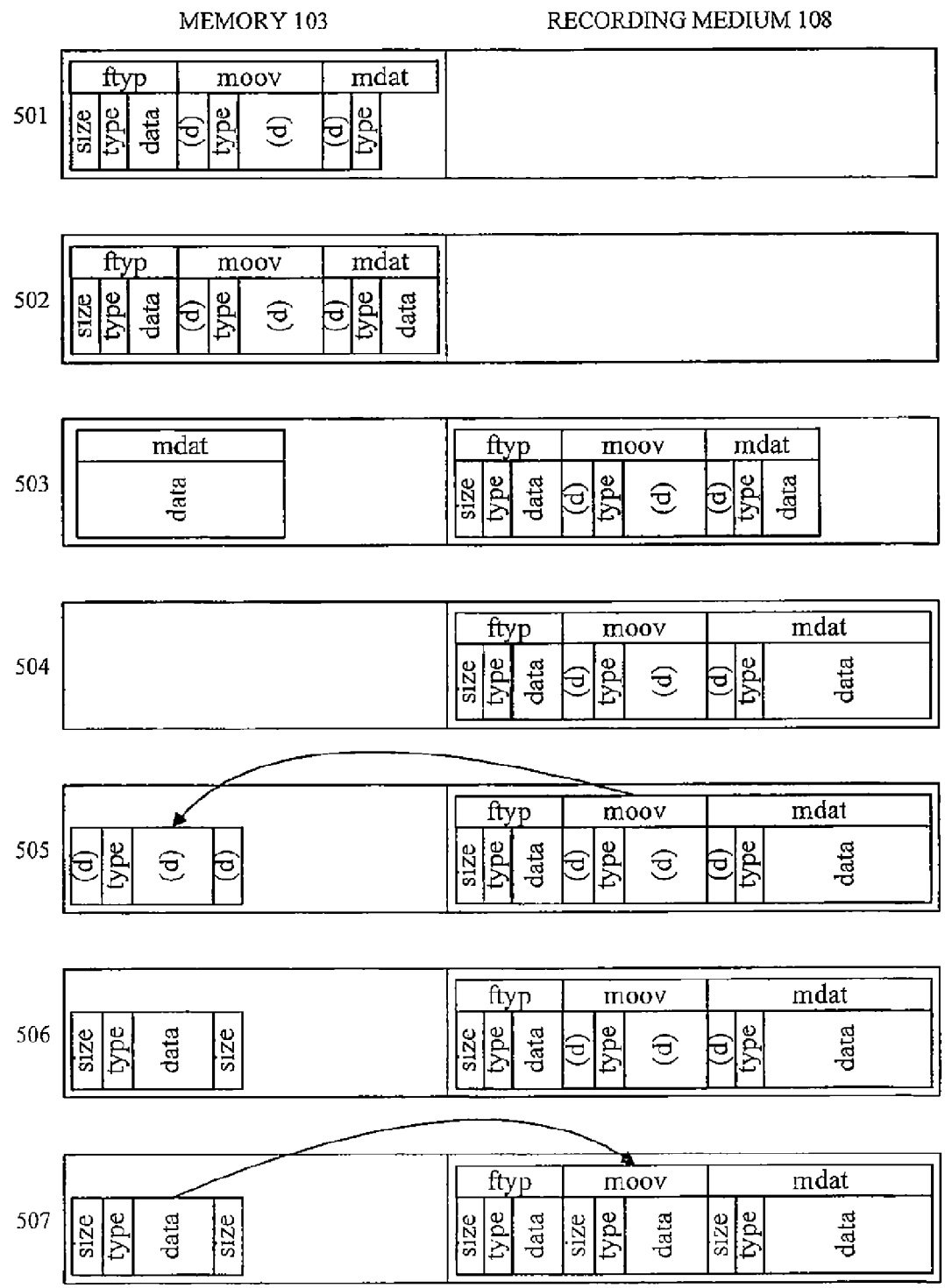
FIG. 5 is a diagram illustrating a construction of a moving image file in the first mode.

The first mode processing will be described. FIG. 4 is a flowchart for the first mode processing. FIG. 5 is a diagram illustrating states of data which is stored into the memory 103 and data which is recorded into the recording medium 109 in the first mode processing.

When the recording start instruction is received, the control unit 106 instructs the file data processing unit 104 so as to form data of the ftyp, moov, and mdat. The file data processing unit 104 forms the ftyp and stores into the memory 103 (S401). The file data processing unit 104 forms the moov box in which an invalid value (dummy data) is stored in each of box-size and box-data and stores into the memory 103 (S402). Further, the file data processing unit 104 forms the mdat box in which an invalid value (dummy data) is stored in the box-size and stores into the memory 103 (S403). A construction of the data stored in the memory 103 at this time is shown at 501 in FIG. 5. In FIG. 5, an invalid value (dummy data) has been stored in an area shown by the notation of (d).

Subsequently, the control unit 106 allows the signal processing unit 102 to start the encoding of the moving image data and audio data. The signal processing unit 102 encodes the moving image data and audio data which are sequentially stored in the memory 103 and stores the encoded moving image data and audio data in the memory 103 (S404). At this time, the signal processing unit 102 stores the moving image data and audio data in the box-data area in the mdat box. The signal processing unit 102 outputs information such as sample data sizes and the like of the encoded moving image data and audio data to the file data processing unit 104 and the control unit 106. A construction of the data stored in the memory 103 at this time is shown at 502 in FIG. 5.

In this manner, the encoding of the moving image data and audio data is continued and the control unit 106 instructs the recording-reproduction unit 108 so as to record the data in accordance with a data amount of unrecorded data stored in the memory 103 reaching a predetermined amount. The recording-reproduction unit 108 reads out the unrecorded data from the memory 103 in order of the ftyp, moov, and mdat and records into the recording medium 109 (S405).

Until a recording stop instruction is input, the control unit 106 allows the encoded moving image data and audio data to be sequentially stored into the memory 103 and, further, continues the recording processing to the recording medium 109. A construction of the data stored in the memory 103 and the data recorded in the recording medium 109 at this time is shown at 503 in FIG. 5.

When the recording stop instruction is received from the operation input unit 107 (S406), the control unit 106 instructs the signal processing unit 102 so as to stop the encoding processing of the moving image and audio and instructs the recording-reproduction unit 108 so as to stop the recording to the recording medium 109. The recording-reproduction unit 108 reads out the unrecorded data of the mdat stored in the memory 103, records into the recording medium 109, and thereafter, stops the recording (S407). A state of the data stored in the memory 103 and the data recorded in the recording medium 109 at this time is shown at 504 in FIG. 5.

Subsequently, the control unit 106 instructs the recording-reproduction unit 108 so as to read out the data in the moov box and the data of the box-size in the mdat box from the MP4 file which is already recorded in the recording medium 109 (S408). The recording-reproduction unit 108 reads out the data in the moov box and the data of the box-size in the mdat box from the MP4 file recorded in the recording medium 109 and stores into the memory 103. A state of the data stored in the memory 103 and the data recorded in the recording medium 109 is shown at 505 in FIG. 5. As shown at 505, each of the data in the moov box stored in the memory 103 and the data of the box-size in the mdat box includes an invalid value.

Subsequently, the control unit 106 instructs the file data processing unit 104 so as to change the invalid value in each of the data in the moov box stored in the memory 103 and the data of the box-size in the mdat box to a correct value. The file data processing unit 104 calculates a size of the moov box and a size of the mdat box on the basis of the information such as a sample data size and the like which are output from the signal processing unit 102 during the recording of the moving image and audio. The file data processing unit 104 also forms data of the moov box and changes the box-data of the moov on the basis of the information such as a sample data size and the like which are output from the signal processing unit 102 during the recording (S409). A state of the data stored in the memory 103 and the data recorded in the recording medium 109 at this time is shown at 506 in FIG. 5.

When the invalid values stored in the memory 103 are changed by the file data processing unit 104 as mentioned above, the control unit 106 instructs the recording-reproduction unit 108 so as to record the updated data. The recording-reproduction unit 108 reads out the data in the moov box and the data of the box-size in the mdat box and updates the data recorded in the original MP4 file (S410). A state of the data stored in the memory 103 and the data recorded in the recording medium 109 at this time is shown at 507 in FIG. 5.

Thus, the data in the MP4 file recorded in the recording medium 109 finally becomes the data in the format of 202 in FIG. 2.

Figure 6:
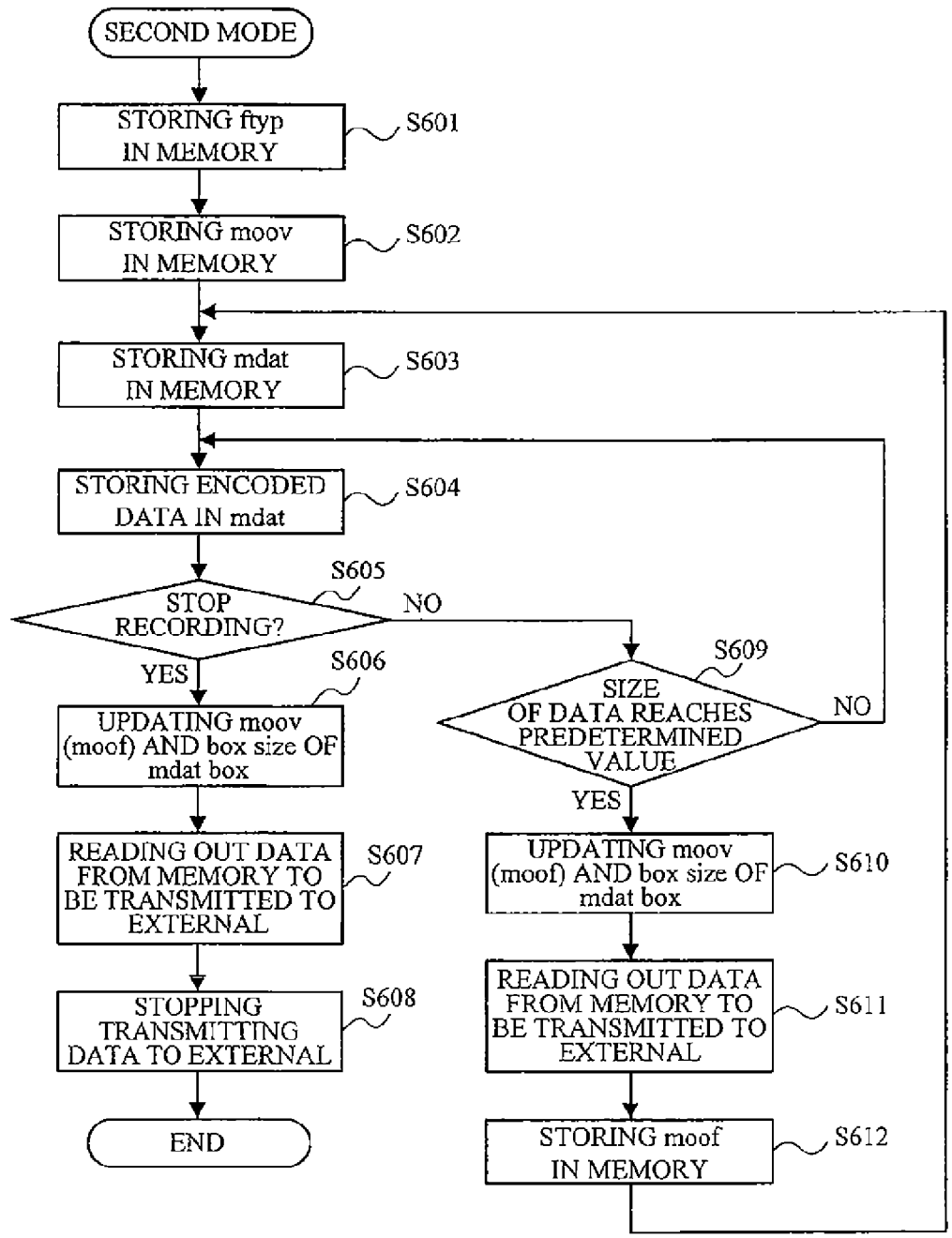
FIG. 6 is a flowchart for a second mode processing according to the embodiment of the invention.
Figure 7:
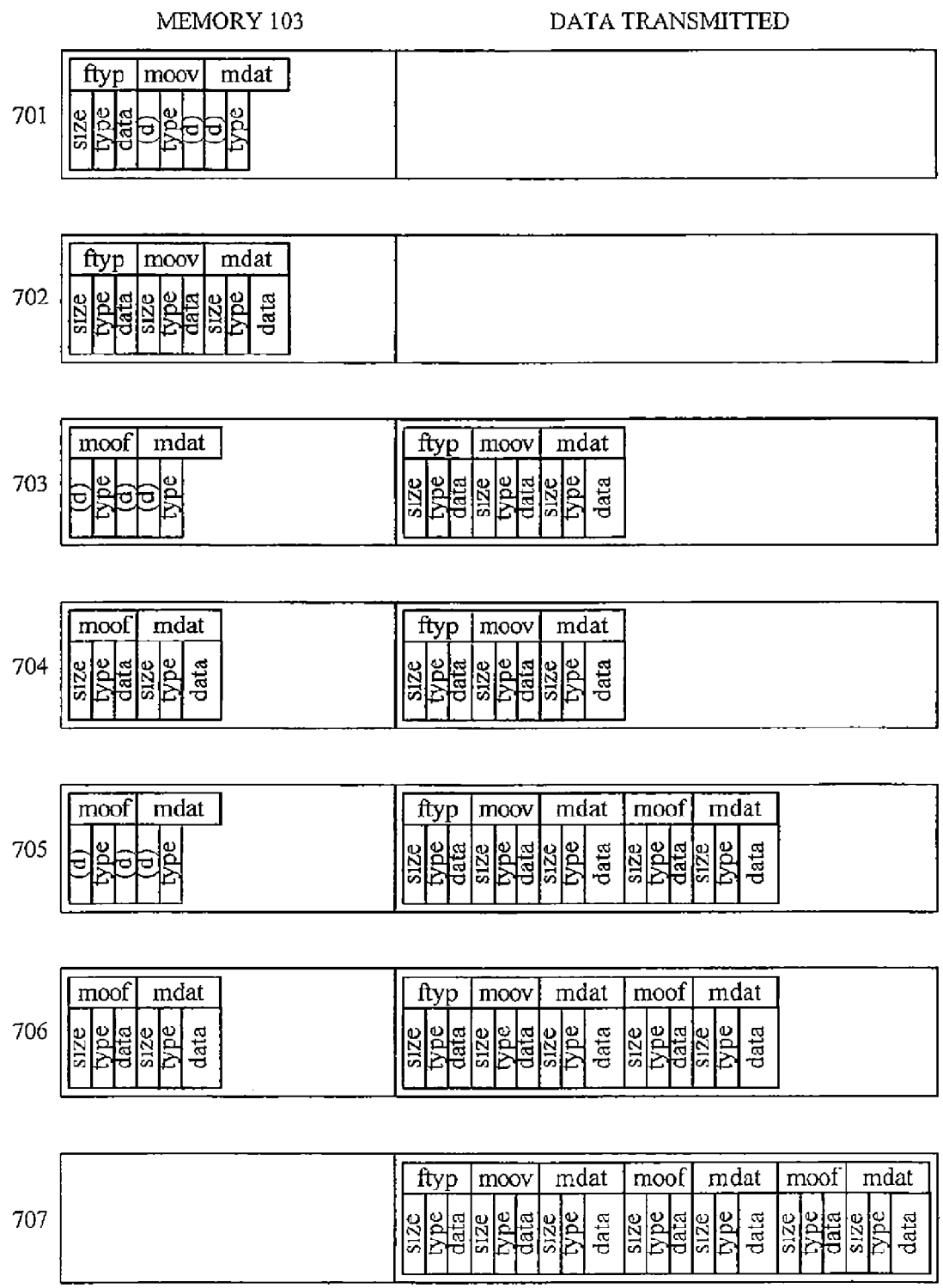
FIG. 7 is a diagram illustrating a construction of a moving image file in the second mode.

Subsequently, the second mode processing will be described. FIG. 6 is a flowchart for the second mode processing. FIG. 7 is a diagram illustrating a construction of the data stored in the memory 103 and the data subjected to the transmission by the external IF 110 in the second mode processing.

When a transmission start instruction is received, the control unit 106 instructs the file data processing unit 104 so as to form the data of the ftyp, moov, and mdat. The file data processing unit 104 forms the ftyp to store into the memory 103 (S601). The file data processing unit 104 forms a moov box in which the invalid value (dummy data) is stored in each of the box-size and the box-data to store into the memory 103 (S602). Further, the file data processing unit 104 forms a mdat box in which the invalid value (dummy data) is stored in the box-size, to store into the memory 103 (S603). A state of the data stored in the memory 103 at this time is shown at 701 in FIG. 7. In FIG. 7, the invalid value (dummy data) is stored in an area shown by the notation of (d).

Subsequently, the control unit 106 allows the signal processing unit 102 to start the encoding of the moving image data and audio data. The signal processing unit 102 encodes the moving image data and audio data which are sequentially stored in the memory 103 and stores the encoded moving image data and audio data into the memory 103 (S604). That is, the signal processing unit 102 stores the moving image data and audio data into the box-data area in the mdat box. The signal processing unit 102 outputs information such as sample data sizes and the like of the encoded moving image data and audio data to the file data processing unit 104 and the control unit 106. A construction of the data stored in the memory 103 at this time is shown at 702 in FIG. 7.

In this manner, the encoding of the moving image data and audio data is continued until a transmission stop instruction is input from the operation input unit 107. If no transmission stop instruction (S605) is input, the control unit 106 discriminates whether or not a data amount of the untransmitted encoded data stored in the memory 103 reaches a predetermined amount L on the basis of the information of a data amount of the encoded moving image data and audio data from the signal processing unit 102 (S609).

If the data amount of the untransmitted encoded data stored in the memory 103 does not reach L, the encoding of the moving image data and audio data is continued as it is. The predetermined amount L can be determined, for example, on the basis of the data amount of the encoded moving image data and audio data, with which amount those data can be stored in the memory 103. That is, the predetermined amount L can be also determined on the basis of the number of frames of the moving image data determined in accordance with an average data rate of the encoded moving image data and audio data, with the number of which frames that data can be stored into the memory 103.

If the data amount of the untransmitted encoded data stored in the memory 103 reaches the predetermined value L, the control unit 106 detects a frame just before a frame at which the data amount reaches the predetermined value, from among in the compressed moving image data stored in the memory 103 at this point of time. Further, the control unit 106 detects a frame of the audio data corresponding to the frame just before the frame at which the data amount reaches the predetermined value, from among the compressed audio data stored in the memory 103. One mdat box is formed by the moving image data up to the frame just before the frame at which the data amount reaches the predetermined value, from the transmission start instruction and the audio data up to an audio frame corresponding to it, and the mdat box is divided. In the present embodiment, the data amount of the encoded moving image data differs every frame. Therefore, the number of frames of the encoded moving image data corresponding to the predetermined value L is not constant. In the present embodiment, if the data amount of the untransmitted encoded data stored in the memory 103 reaches the predetermined value L, the moving image data is divided on a frame unit basis. The audio data corresponding to the frame of the divided moving image data is divided on an audio frame unit basis.

The control unit 106 instructs the file data processing unit 104 so as to change the invalid value of each of the data in the moov box stored in the memory 103 and the data of the box-size in the mdat box to a correct value.

The file data processing unit 104 calculates a size of the moov box and a size of the mdat box and changes the data of the box-size on the basis of the information such as a sample data size and the like which are output from the signal processing unit 102 during the recording of the moving image and audio. The file data processing unit 104 also forms the data in the moov box and changes box-data of the moov on the basis of the information such as a sample data size and the like which are output from the signal processing unit 102 (S610). The file data processing unit 104 also stores track information (data of interchangeability of the moving image and audio such as a compression method and the like) of the moving image data and audio data into data-box of the moov. By this processing, one moov box is formed. A construction of the data stored in the memory 103 at this time is shown at 702 in FIG. 7.

The control unit 106 instructs the external IF 110 so as to transmit the untransmitted data including the ftyp box and one moov box and one mdat box which are updated as mentioned above to the outside. The external IF 110 reads out the untransmitted data from the memory 103 and transmits to the network 112 (S611). At this time, the external IF 110 first transmits the ftyp box and subsequently transmits the moov box and the mdat box in this order. When the transmission of the designated untransmitted data is completed, the external IF 110 stops the transmission.

Subsequently, the control unit 106 instructs the file data processing unit 104 so as to newly form a moof box and a mdat box. The file data processing unit 104 newly forms the moof box in which an invalid value (dummy data) is stored in each of the box-size and box-data, to be stored into the memory 103 (S612). Further, the file data processing unit 104 forms the mdat box in which an invalid value (dummy data) is stored in the box-size, to be stored into the memory 103 (S603). A state of the data stored in the memory 103 at this time and the data subjected to the transmission is shown at 703 in FIG. 7.

The encoding of the moving image data and audio data is continued. If there is no transmission stop instruction and a data amount of the untransmitted encoded moving image data and audio data which are stored in the memory 103 reaches L, the control unit 106 forms one mdat box by the moving image data stored in the memory 103 at that point of time and the corresponding audio data.

The control unit 106 instructs the file data processing unit 104 so as to change the invalid value of each of the data in the moof box stored in the memory 103 and the data of the box-size in the mdat box to a correct value in accordance with the file format of MP4. The file data processing unit 104 calculates a size of the moof box and a size of the mdat box and changes the data of the box-size on the basis of the information such as a sample data size and the like which are output from the signal processing unit 102 during the recording of the moving image and audio. The file data processing unit 104 forms data in the moof box and changes box-data of the moof on the basis of the information such as a sample data size and the like which are output from the signal processing unit 102 during the recording (S610). A construction of the data stored in the memory 103 at this time and the data subjected to the transmission is shown at 704 in FIG. 7. As mentioned above, management information of the moving image data stored in the mdat which is subsequently transmitted after the moof is stored in the moof in a manner similar to that mentioned above.

The control unit 106 instructs the external IF 110 so as to transmit the untransmitted data including the moof box and mdat box which are updated as mentioned above, to the outside. The external IF 110 reads out the untransmitted data from the memory 103 to be transmitted to the network 112 (S611). When the transmission of the designated untransmitted data is completed, the external IF 110 stops the transmission.

Subsequently, the control unit 106 instructs the file data processing unit 104 so as to newly form a moof box and a mdat box. The file data processing unit 104 newly forms a moof box in which an invalid value (dummy data) is stored in each of the box-size and box-data, to be stored into the memory 103 (S612). The file data processing unit 104 forms the mdat box in which an invalid value (dummy data) is stored in the box-size, to be stored into the memory 103 (S603). A construction of the data stored in the memory 103 at this time and the data subjected to the transmission is shown at 705 in FIG. 7.

The processings are similarly repeated hereinafter until the transmission stop instruction is received. When the transmission stop instruction is received from the operation input unit 107 (S605), the control unit 106 instructs the signal processing unit 102 so as to stop the encoding of the moving image and audio. The control unit 106 forms one mdat box by the moving image data and audio data stored in the memory 103 at the point of time when the transmission stop instruction is received.

The control unit 106 instructs the file data processing unit 104 so as to change the invalid value of each of the data in the moof box stored in the memory 103 and the data of the box-size in the mdat box, to a correct value. The file data processing unit 104 calculates the size of the moof box and the size of the mdat box and changes the data of the box-size on the basis of the information such as a sample data size and the like which are output from the signal processing unit 102 during the recording of the moving image and audio. The file data processing unit 104 forms data in the moof box and changes the box-data of the moof on the basis of the information such as a sample data size and the like which are output from the signal processing unit 102 during the recording (S606). A construction of the data stored in the memory 103 at this time and the data subjected to the transmission is shown at 706 in FIG. 7.

The control unit 106 instructs the external IF 110 so as to transmit the untransmitted data including the moof box and mdat box which are updated as mentioned above to the outside. The external IF 110 reads out the untransmitted data from the memory 103 and transmits to the network 112 (S607). When the transmission of the designated untransmitted data is completed, the external IF 110 stops the transmission (S608). A construction of the data stored in the memory 103 at this time and the data subjected to the transmission is shown at 707 in FIG. 7. Thus, a format of the moving image file which is transmitted is the format as shown at 203 in FIG. 2.

As mentioned above, in the present embodiment, in the case where the encoded data is recorded into the recording medium in accordance with the MP4 file format while encoding the information data such as moving image, audio, and the like, the invalid values are stored into the management information and the management information is recorded into the recording medium. After the recording is stopped, values in the management information recorded in the recording medium are updated. Therefore there is no need to prepare a memory of a large capacity for storing the management information during the recording.

In the embodiment, in the case where the encoded data is transmitted to the outside in accordance with the MP4 file format while encoding the moving image and audio, a plurality of mdat boxes are formed one by one in accordance with the data amount of the encoded moving image and audio reaching the predetermined value. The moov (moof) data is transmitted together with each mdat box. At this time, the data is transmitted in order of ftyp→moov (moof)→mdat box. Therefore, in an apparatus on a reception side, the received data can be sequentially decoded to be output.

Although the present embodiment uses such a construction that the moving image and audio are encoded and recorded or transmitted in accordance with the MP4 file format, another format can be also used. For example, the invention can be similarly applied to such a construction that the management information such as a data size and the like is provided before the moving image data and audio data.

In the present embodiment, the first mode processing and the second mode processing are switched in accordance with the selected mode between the recording mode and the transmission mode. However, the embodiment is not limited to such a method. For example, it is also possible to construct such that the first mode processing is executed in the case of generating a file for recording data in a rewritable recording medium and the second mode processing is executed in the case of generating a file for recording data into a write-once recording medium in which the recording data cannot be rewritten. That is, it is possible to arrange such that one of the type shown in the file 202 and the type shown in the file 203 in FIG. 2 is determined as a file format in accordance with an output destination of the generated file.

Although the mdat is divided in accordance with that the data amount of the untransmitted encoded moving image and audio data which are stored in the memory 103 reaches the predetermined value L (for every predetermined amount) in the embodiment, mdat may be divided in accordance with the data amount of moof reaching a predetermined value M.

For example, in the memory 103, a storage area for the moof and a storage area for the mdat are preliminarily allocated. The mdat is divided in accordance with that the data stored in the storage area for the moof reaches the predetermined value M (M<L) and is transmitted. In this case, even if the data amount of the untransmitted encoded moving image and audio data which are stored in the storage area for the mdat does not reach the predetermined value L, the mdat is divided at that point of time.

Second Embodiment

Subsequently, the second embodiment will be described. The embodiment will be described with respect to processings for reproducing the recorded data of the MP4 format and transmitting to the outside. Also in this embodiment, the processings which will be described with reference to flowcharts are realized by a method whereby the control unit 106 loads the program stored in the memory (not shown) and executes it, thereby controlling each unit.

Figure 8:
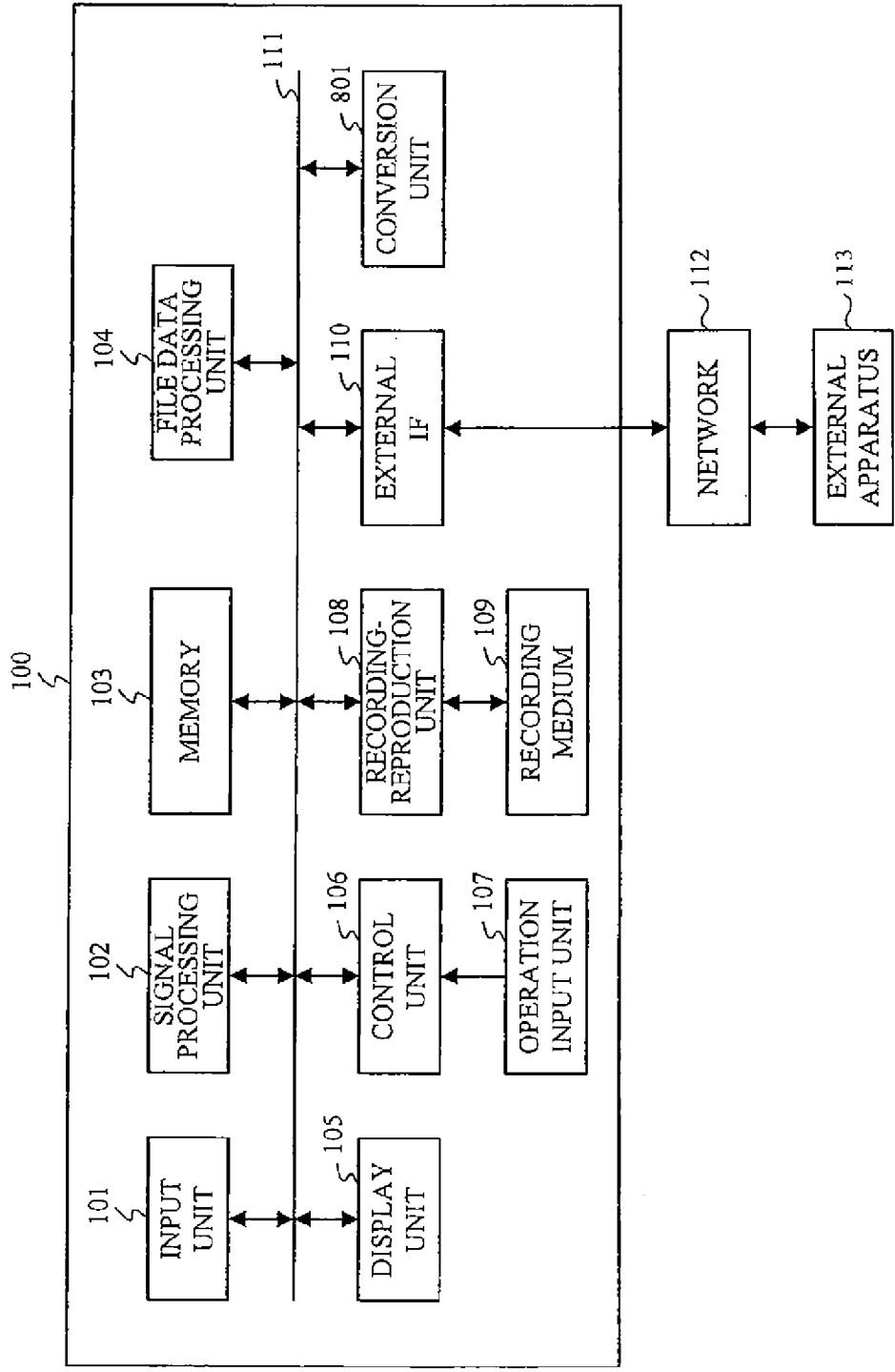
FIG. 8 is a block diagram illustrating another constructional example of a data processing apparatus according to an embodiment of the invention.

FIG. 8 is a diagram illustrating a construction of the data processing apparatus 100 according to the second embodiment. In the apparatus of FIG. 8, a conversion unit 801 is added to the construction of FIG. 1. In the embodiment, the number of pixels of one picture of the moving image data reproduced from the recording medium 109 is changed and the changed moving image data can be transmitted to the outside. Also in the apparatus of FIG. 8, the processings of FIGS. 3, 4, and 6 can be executed in a manner similar to the first embodiment. In the apparatus of FIG. 8, a transmission processing of the moving image file recorded in the recording medium 109 will be described hereinbelow.

Before the moving image file recorded in the recording medium 109 is transmitted, the user can set with the operation input unit 107 whether or not the number of pixels of the moving image which is transmitted is changed. In the embodiment, the number of pixels of one picture of the moving image data which is recorded in the recording medium 109 by the processings of FIG. 4 is assumed to be the first number of pixels. The user can instruct to change the number of pixels of the moving image recorded in the recording medium 109 to a second number of pixels smaller than the first number of pixels and to transmit the moving image data to the outside.

Figure 9:
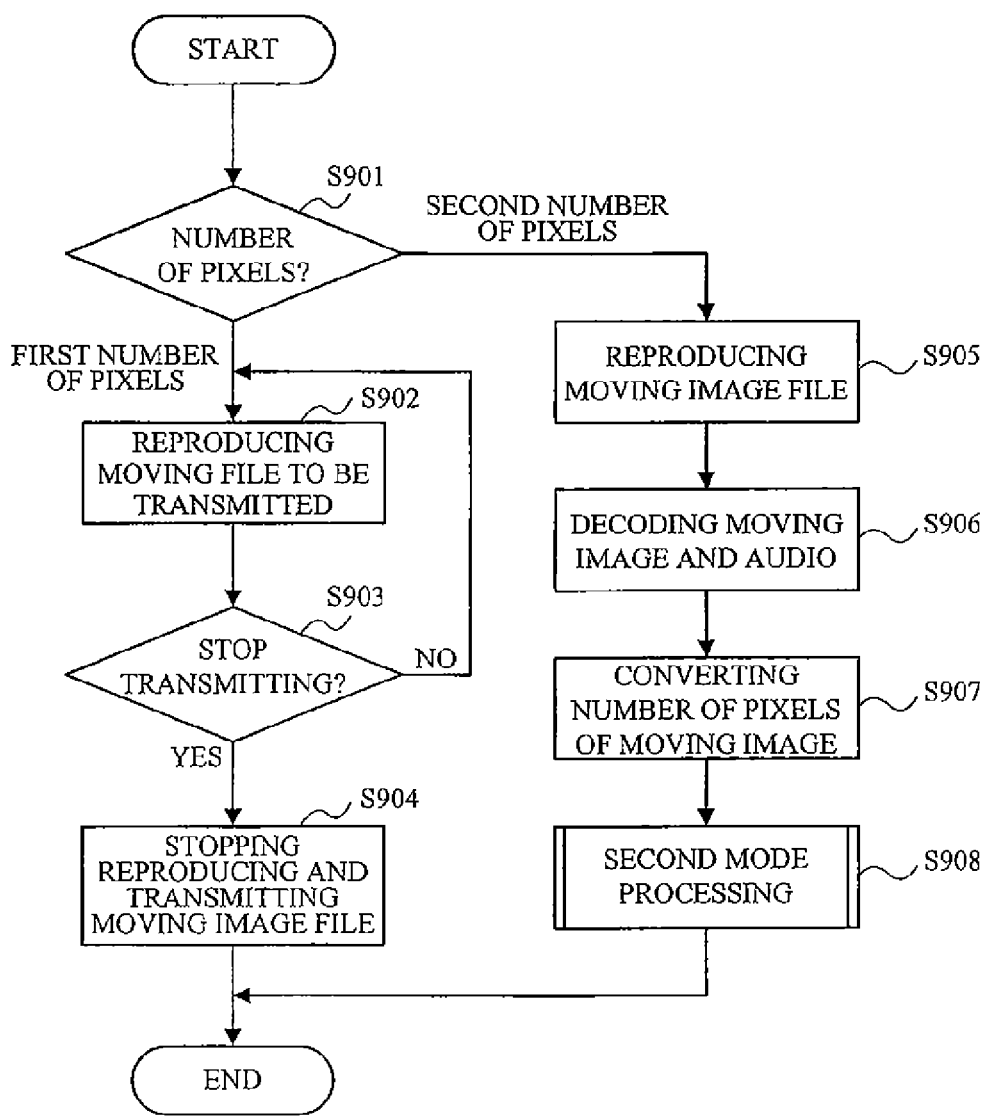
FIG. 9 is a flowchart for an example of the operation in another constructional example of the data processing apparatus according to the embodiment of the invention.

FIG. 9 is a flowchart for the transmission processing of the moving image file recorded in the recording medium 109 to the outside of the apparatus. The processings of FIG. 9 are executed by a method whereby the control unit 106 controls each unit.

When the number of pixels of the moving image which is transmitted is set by the user and the transmission of the moving image file is instructed, the processings are started. First, the control unit 106 discriminates the number of pixels of the moving image which is transmitted (S901). If the number of pixels of the moving image which is transmitted is equal to the same first number of pixels as that of the recorded moving image, the control unit 106 instructs the recording-reproduction unit 108 so as to reproduce the designated moving image file. The recording-reproduction unit 108 sequentially reads out the designated moving image file from the recording medium 109 and stores into the memory 103. The control unit 106 instructs the external IF 110 to transmit the data of the moving image file stored in the memory 103 to the outside. The external IF 110 reads out the data of the moving image file stored in the memory 103 and sequentially transmits to the external apparatus 113 through the network 112 (S902).

When the transmission stop instruction is received from the operation input unit 107 or if the reproduction of the moving image file which is being reproduced is completed up to the end thereof (S903), the control unit 106 stops the reproduction of the moving image file which is executed by the recording-reproduction unit 108. At the same time, the transmission of the MP4 file by the external IF 110 is also stopped (S904).

If the number of pixels of the moving image which is transmitted is equal to the second number of pixels in S901, the control unit 106 instructs the recording-reproduction unit 108 to reproduce the designated moving image file. The recording-reproduction unit 108 sequentially reads out the designated moving image file from the recording medium 109 and stores into the memory 103 (S905). Subsequently, the file data processing unit 104 detects the data of the moov box included in the reproduced moving image file while parsing the data of the MP4 file stored in the memory 103. Necessary data such as a sample data size and the like in this moov is obtained and sent to the control unit 106. The control unit 106 instructs the recording-reproduction unit 108 to sequentially read out the data of the moving image file from the recording medium 109, on the basis of the data sent from the file data processing unit 104. The control unit 106 instructs the signal processing unit 102 to decode the moving image data and audio data in the mdat box. The signal processing unit 102 reads out and decodes the encoded moving image data and audio data from the memory 103 and stores into the memory 103 (S906).

The control unit 106 instructs the conversion unit 801 to change the number of pixels of the decoded moving image data to the second number of pixels. The conversion unit 801 sequentially reads out the frames of the decoded moving image data from the memory 103 and changes the number of pixels of each frame from the first number of pixels to the second number of pixels. The conversion unit 801 stores the moving image data of the second number of pixels into the memory 103 (S907).

Subsequently, the control unit 106 executes the foregoing second mode processing, converts the moving image data and audio data of the second number of pixels stored in the memory 103 into the data of the MP4 file format, and transmits by the external IF 110 (S908). In the first embodiment, the moving image data and audio data obtained by the input unit 101 are encoded, converted into the data of the MP4 file format, and transmitted. In the second embodiment, the moving image data which is reproduced from the recording medium 109 and converted into the second number of pixels by the conversion unit 801 and the reproduced audio data instead of the moving image data and audio data from the input unit 101 are encoded. The encoded moving image data and audio data are converted into the data of the MP4 file format and transmitted from the external IF 110 to the external apparatus 113 through the network 112 by the processings of FIG. 6.

In the case where the number of pixels of the moving image reproduced from the recording medium is converted, the converted moving image is encoded again, and transmitted as mentioned above, the size of moving image data is not decided until all of the moving images of a file to be subjected to the transmission are encoded.

Therefore, in the present embodiment, in the case where after the number of pixels of the reproduced moving image is converted, the moving image is encoded again and transmitted to the outside, one mdat box is formed in accordance with a predetermined amount of the moving image and audio being encoded. The moov (moof) data is transmitted together with the mdat box. Therefore, the apparatus on the reception side can sequentially decode and output the received data.

In the present embodiment, although the invention is described with respect to the example in which the conversion of the number of pixels is performed to the reproduced encoded moving image data and the resultant data is transmitted to the outside, the invention is not limited to this. For example, naturally, even in the case where a conversion of a frame rate (for example, frame thinning-out) is performed in place of the conversion of the number of pixels or in addition to it and the resultant data is transmitted, the invention can be applied to the decoding and re-encoding of the reproduction data.

Third Embodiment

Subsequently, the third embodiment will be described. The data processing apparatus 100 in the third embodiment is similar to that in FIG. 8. Also in the third embodiment, the processings of FIGS. 3, 4, 6, and 9 can be executed in a manner similar to the first and second embodiments. In the third embodiment, when the moving image file is transmitted to the external apparatus, the predetermined value L is set on the basis of a size of buffer memory provided in the external apparatus for temporarily storing the moving image file received by the external apparatus.

The transmission processing of the moving image file in the third embodiment will be described hereinbelow. Also in the present embodiment, processings which will be described by using flowcharts are realized by a method whereby the control unit 106 loads the program stored in the memory (not shown) and executes, thereby controlling each unit.

Figure 10:
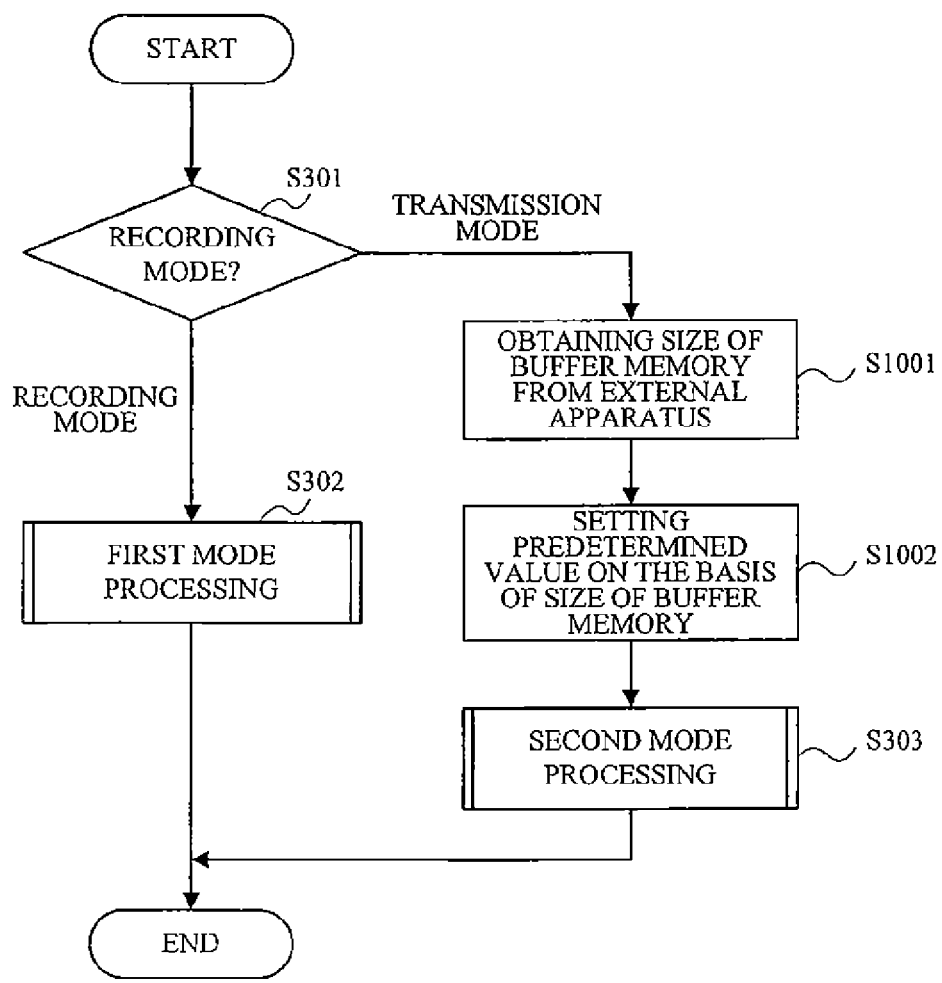
FIG. 10 is a flowchart for another example of the operation in another constructional example of the data processing apparatus according to the embodiment of the invention.

FIG. 10 is a flowchart illustrating the processings upon recording in the third embodiment. Processings similar to those in FIG. 3 are designated by the same reference numerals and their detailed description is omitted here. When the recording start instruction is received, if the transmission mode is set, through the external IF 110, the control unit 106 inquires of the external apparatus 113 about the size of buffer memory provided in the external apparatus 113 for temporarily storing the moving image file received by the external apparatus 113. The external IF 110 receives information regarding the size of buffer memory from the external apparatus 113 and notifies the control unit 106 of it (S1001). On the basis of the size of buffer memory received by the external IF 110, the control unit 106 sets the predetermined value L which is used in the transmission mode to a value smaller than the size of buffer memory (S1002). After that, the second mode processing is executed as mentioned above (S303).

As mentioned above, in the embodiment, the size of buffer memory in the external apparatus of the transmission destination of the moving image file is obtained in the transmission mode. The predetermined value L is set so as not to exceed the buffer memory size.

Therefore, a size of each mdat box of the moving image file which is transmitted in the transmission mode is smaller than the size of buffer memory of the external apparatus 113 on the reception side. Therefore, the external apparatus 113 can receive, in a good condition, the moving image file transmitted from the data processing apparatus 100.

Although the present embodiment is described with respect to the apparatus for recording the moving image data and audio data, the invention can be also similarly applied to an apparatus for recording another information data which is input. Although in the present embodiment, the predetermined value L is set based on the size of the buffer memory of the external apparatus 113, if a capacity of a storage area of the memory 103 into which the encoded moving image data and audio data are stored is smaller than the size of the buffer memory of the external apparatus 113, the predetermined value L is set based on the capacity of the storage area of the memory 103 into which the encoded moving image data and audio data are stored.

Other Embodiments

Each unit constructing the recording apparatus in each of the embodiments of the invention mentioned above and each step of the recording method can be realized by a method whereby the program stored in a RAM, a ROM, or the like of a computer operates. The program and a non-transitory computer-readable storage medium in which the program is stored are incorporated in the invention.

The invention can be also embodied, for example, as a system, an apparatus, a method, a program, a non-transitory computer-readable storage medium, or the like. Specifically speaking, the invention may be applied to a system constructed by a plurality of apparatuses or may be applied to an apparatus constructed by one equipment.

The invention incorporates a case where a program (in the embodiments, a program corresponding to the flowcharts illustrated in FIGS. 3, 4, and 6) of software for realizing the functions of the embodiments as mentioned above is supplied to a system or an apparatus directly or from a remote place. The invention also incorporates a case where a computer of the system or apparatus reads out and executes a program code of the supplied program, so that those functions are accomplished.

Therefore, the program code itself which is installed into the computer in order to realize the functions and processings of the invention by the computer also realizes the invention. That is, the invention incorporates the computer program itself to realize the functions and processings of the invention. In this case, the program code may have any form such as object code, program which is executed by an interpreter, script data which is supplied to the OS, or the like so long as it has a function of the program.

As a storage medium for supplying the program, for example, there is a flexible disk, a hard disk, an optical disk, a magnetooptic disk, or the like. Further, there is also an MO, a CD-ROM, a CD-R, a CD-RW, a magnetic tape, a non-volatile memory card, a ROM, a DVD (DVD-ROM, DVD-R), or the like.

As another program supplying method, there is a method of connecting to Homepage of the Internet by using a browser of a client computer. The program can be also supplied by downloading the computer program itself of the invention or a compressed file including an automatic installing function into a storage medium such as a hard disk or the like from Homepage.

The program supplying method can be also realized by a method whereby the program code constructing the program of the invention is divided into a plurality of files and each file is downloaded from different Homepage. That is, a WWW server for allowing a plurality of users to download a program file for realizing the functions and processings of the invention by the computer is also incorporated in the invention.

As another method, the program supplying method can be also realized by a method whereby the program of the invention is encrypted, stored into a storage medium such as a CD-ROM or the like, and distributed to the users, and the users who cleared a predetermined condition are allowed to download key information for decrypting the encryption from Homepage through the Internet, and the encrypted program is executed by using the key information and installed into the computer.

The functions of the embodiments mentioned above are realized by a method whereby the computer executes the read-out program. Further, on the basis of instructions of the program, the OS or the like which is operating on the computer executes a part or all of actual processings, and the functions of the embodiments mentioned above are realized by those processings.

As further another method, the program read out from the storage medium is written into a memory provided for a function expanding board inserted in the computer or a function expanding unit connected to the computer, a CPU or the like provided for the function expanding board or function expanding unit executes a part or all of actual processings, and the functions of the embodiments mentioned above are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189397, filed Aug. 31, 2011, which is hereby incorporated by reference herein in its entirety.

What is claimed is:

1. A data processing apparatus comprising:
an input unit configured to input information data;
an encoding unit configured to encode the information data input by the input unit;
a generation unit configured to generate an information file which has one or more first storage unit elements and one or more second storage unit elements,
wherein the information data encoded by the encoding unit is stored in the first storage unit element and management information of the encoded information data stored in the first storage unit element is stored in the second storage unit element;
a control unit configured to control the encoding unit and the generation unit to generate a single information file having a plurality of first storage unit elements and a plurality of second storage unit elements while encoding the input information data; and
a transmission unit configured to transmit the single information file generated by the generation unit to an external apparatus through a network,
wherein the control unit controls the generation unit to generate the single information file by generating, as one of the plurality of first storage unit elements, a new first storage unit element, in which a predetermined amount of the encoded information data is stored, every time an amount of the information data encoded by the encoding unit reaches the predetermined amount and generating a new second storage unit element, as one of the plurality of second storage unit elements, corresponding to the new first storage unit element,
wherein the information data includes moving image data and audio data, and
wherein the control unit controls the generation unit such that every time an amount of the information data including the moving image data encoded by the encoding unit and the audio data encoded by the encoding unit reaches the predetermined amount, a predetermined number of frames of the moving image data and the audio data corresponding to the predetermined number of frames of the moving image data are stored in the new first storage unit element.

2. An apparatus according to claim 1, wherein the generation unit adds the new first storage unit element subsequently to the new second storage unit element corresponding to the new first storage unit element.

3. An apparatus according to claim 1, wherein in the first storage unit element has first size information indicating size of the first storage unit element and the second storage unit element has second size information indicating size of the second storage unit element, and wherein in accordance with the predetermined amount of the encoded information data being stored in the new first storage unit element, the generation unit forms management information of the predetermined amount of encoded information data stored in the new first storage unit element and the second size information of the new second storage unit element in which the management information is stored, and generates the first size information of the new first storage unit element.

4. An apparatus according to claim 1,
wherein the control unit controls the transmission unit so as to transmit the new second storage unit element corresponding to the new first storage unit element, in accordance with the first storage unit element being formed, and subsequently transmit the new first storage unit element.

5. An apparatus according to claim 1,
wherein the control unit controls a communication unit to obtain size information of a buffer memory provided in the external apparatus from the external apparatus and sets the predetermined amount on the basis of the obtained size information of the buffer memory.

6. An apparatus according to claim 1, further comprising:
a memory for storing the encoded information data,
wherein the generation unit generates the first storage unit element using the encoded information data stored in the memory and the control unit determines the predetermined amount in accordance with a storage capacity of the memory.

7. A non-transitory computer-readable storage medium storing a program comprising a program code for causing a computer to function as each unit of the data processing apparatus recited in claim 1.

8. An apparatus according to claim 1, wherein the information file is an MP4 file, the first storage unit element MovieDataBox, and the second storage unit element is MovieBox or MovieFragmentBox.

9. A data processing apparatus comprising:
an input unit configured to input information data;
an encoding unit configured to encode the information data input by the input unit;
a generation unit configured to generate an information file which has one or more first storage unit elements and one or more second storage unit elements,
wherein the information data encoded by the encoding unit is stored in the first storage unit element and management information of the encoded information data stored in the first storage unit element is stored in the second storage unit element;
an output unit configured to output the information file generated by the generation unit to the plurality of output destinations; and
a control unit configured to set, in accordance with the output destination of the output unit, one of a first mode in which the generation unit generates a single information file having only one first storage unit element and only one second storage unit element and a second mode in which the generation unit generates a single information file having a plurality of first storage unit elements and a plurality of second storage unit elements,
wherein in the second mode, the generation unit generates the single information file by generating, as on of the plurality of first storage unit elements, a new first storage unit element, in which a predetermined amount of the encoded information data is stored, every time an amount of the information data encoded by the encoding unit reaches the predetermined amount while encoding the input information data, and generating a new second storage unit element, as on of the plurality of second storage unit elements, corresponding to the new first storage unit element.

10. An apparatus according to claim 9, wherein the control unit sets the first mode in the case where the output destination of the output unit is a recording apparatus for recording the information file in a recording medium, and sets the second mode in the case where the output destination of the output unit is a network.

11. An apparatus according to claim 10, wherein the control unit controls the output unit to obtain size information of a buffer memory from the output destination through the network and sets the predetermined amount on the basis of the obtained size information of the buffer memory.

12. A non-transitory computer-readable storage medium storing a program for causing the computer to function as each unit of the data processing apparatus recited in claim 9.

13. An apparatus according to claim 9, wherein the information data includes moving image data and audio data, and
- wherein in the second mode, the generation unit stores, every time an amount of the information data including the moving image data encoded by the encoding unit and the audio data encoded by the encoding unit reaches the predetermined amount, a predetermined number of frames of the moving image data and the audio data corresponding to the predetermined number of frames of the moving image data in the new first storage unit element.

14. A control method of a data processing apparatus having an input unit configured to input information data, comprising:
- an encoding step of encoding the information data input by the input unit;
- a generation step of generating an information file which has one or more first storage unit elements and one or more second storage unit elements,
- wherein the information data encoded in the encoding step is stored in the first storage unit element and management information of the encoded information data stored in the first storage unit element is stored in the second storage unit element;
- a control step of controlling the encoding step and the generation step to generate a single information file having a plurality of first storage unit elements and a plurality of second storage unit elements while encoding the input information data; and
- a transmission step of transmitting the single information file generated in the generation step to an external apparatus through a network,
- wherein the control step controls the generation step to generate the single information file by generating, as one of the plurality of first storage unit elements a new first storage unit element, in which a predetermined amount of the encoded information data is stored, every time an amount of the information data encoded in the encoding step reaches the predetermined amount and generating a new second storage unit element, as one of the plurality of second storage unit elements, corresponding to the new first storage unit element,
- wherein the information data includes moving image data and audio data, and
- wherein the control step controls the generation step such that every time and amount of the information data including the moving image data encoded in the encoding step and the audio data encoded in the encoding step reaches the predetermined amount, a predetermined number of frames of the moving image data and the audio data corresponding to the predetermined number of frames of the moving image data are stored in the new first storage unit element.

15. A control method of a data processing apparatus having an input unit configured to input information data and an output unit configured to output the processed information data, comprising:
- an encoding step of encoding the information data input by the input unit;
- a generation step of generating an information file which has one or more first storage unit elements and one or more second storage unit elements,
- wherein the information data encoded in the encoding step is stored in the first storage unit element and management information of the encoded information data stored in the first storage unit element is stored in the second storage unit element;
- an output step of outputting the information file generation step to a plurality of output destinations by the output unit; and
- a control step of settling, in accordance with the output destination in the output step, one of the first mode in which the generation step generates a single information file having only one first storage unit element and only one second storage unit element and a second mode in which the generating step generates a single information file having a plurality of first storage unit elements and a plurality of second storage unit elements,
- wherein in the second mode, the generation step generates the single information file by generating, as one of the plurality of the first storage unit elements, a new first storage unit element, in which a predetermined amount of the encoded information data is stored, every time an amount of the information data encoded in the encoding step reaches the predetermined amount while encoding the input information data, and generating a new second storage unit element, as one of the plurality of second storage unit elements, corresponding to the new first storage unit element.

* * * * *